United States Patent
Novosad et al.

(10) Patent No.: US 8,416,238 B2
(45) Date of Patent: Apr. 9, 2013

(54) MODULAR SHADER ARCHITECTURE AND METHOD FOR COMPUTERIZED IMAGE RENDERING

(75) Inventors: Justin Novosad, Verdun (CA); Eric Bourque, Laval (CA); Matthew Lausch, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 728 days.

(21) Appl. No.: 12/388,350

(22) Filed: Feb. 18, 2009

(65) Prior Publication Data

US 2010/0207943 A1 Aug. 19, 2010

(51) Int. Cl.
*G06T 15/50* (2011.01)

(52) U.S. Cl.
USPC ........... 345/421; 345/420; 345/422; 345/418; 345/419; 345/423; 345/424

(58) Field of Classification Search .......... 345/418–420, 345/426
See application file for complete search history.

(56) References Cited

U.S. PATENT DOCUMENTS

| | | | |
|---|---|---|---|
| 5,930,756 A * | 7/1999 | Mackie et al. | 704/260 |
| 6,664,961 B2 | 12/2003 | Ray et al. | |
| 6,819,325 B2 | 11/2004 | Boyd et al. | |
| 7,142,216 B2 | 11/2006 | Boyd et al. | |
| 7,218,291 B2 | 5/2007 | Abdalla et al. | |
| 7,233,332 B2 | 6/2007 | Lokovic et al. | |
| 7,463,259 B1 * | 12/2008 | Kolb et al. | 345/426 |
| 7,583,275 B2 | 9/2009 | Neumann et al. | |
| 2003/0002729 A1 | 1/2003 | Wittenbrink | |
| 2005/0080602 A1 | 4/2005 | Snyder et al. | |
| 2006/0055695 A1 | 3/2006 | Abdulla et al. | |
| 2007/0075998 A1 | 4/2007 | Cook et al. | |
| 2008/0228449 A1 | 9/2008 | Birtwistle et al. | |
| 2009/0128551 A1 * | 5/2009 | Bakalash et al. | 345/419 |
| 2009/0303247 A1 | 12/2009 | Zhang et al. | |
| 2009/0322751 A1 | 12/2009 | Oneppo et al. | |
| 2010/0073369 A1 | 3/2010 | McCombe et al. | |

OTHER PUBLICATIONS

Whitted T. Foley J, (1979) An improved illumination model for shaded display. Proceedings of the 6th annual conference on Computer graphics and interactive techniques.*
Office Action, U.S. Appl. No. 12/197,190 dated Jul. 7, 2011.
Final Office Action, U.S. Appl. No. 12/197,190, dated Dec. 15, 2011.
Non-Final Office Action, U.S. Appl. No. 12/478,671, dated May 25, 2012.
Purcell, "Ray Tracing on a Stream Processor," A dissertation submitted to the department of computer science and the committee on graduate studies of Stanford University in partial fulfillment of the requirements for the degree of doctor of philosophy, Mar. 2004, 125 pages.
Office Action, U.S. Appl. No. 12/478,671, dated May 25, 2012.
Office Action, U.S. Appl. No. 12/197,190 dated Dec. 15, 2011.

* cited by examiner

*Primary Examiner* — Ulka Chauhan
*Assistant Examiner* — Sultana M Zalalee
(74) *Attorney, Agent, or Firm* — Patterson & Sheridan, LLP

(57) ABSTRACT

One embodiment of the present invention sets forth a technique rendering an image pixel within a graphics image with multiple shaders in a single rendering phase using a modular shader architecture. A user specifies how geometric objects, light sources, and various types of rendering operations in a graphics scene are associated. A rendering application provides computational infrastructure for rendering operations that includes finding an intersected object for each pixel of a target graphics image. The modular shader architecture includes a means for efficiently developing and incorporating custom shader modules for use by the rendering application.

20 Claims, 8 Drawing Sheets

MODULAR SHADER ARCHITECTURE AND METHOD FOR COMPUTERIZED IMAGE RENDERING

BACKGROUND OF THE INVENTION

1. Field of the Invention

Embodiments of the present invention relate generally to rendering graphics images and more specifically to a modular shader architecture and method for computerized image rendering.

2. Description of the Related Art

High-quality graphics rendering applications are commonly used to generate highly refined images, such as photorealistic graphics images, from mathematical models of three-dimensional (3D) graphics scenes. A graphics scene typically comprises scene objects with material properties, light sources with associated properties, camera positions, and other relevant data configured within a scene database of a modeling application. The modeling application conventionally generates a render database from the scene database. The high-quality rendering application traverses the render database to render a highly refined image from the graphics scene represented within the render database.

The high-quality graphics rendering application typically calls a plurality of shaders configured to impart various physically and visually significant effects on objects within the graphics scene. A shaded pixel may comprise contributions, organized as contribution types, from the plurality of shaders. Each type of shader, such as a material shader, may generate shading results from results computed by a plurality of other shaders, such as lighting shaders. For example, a material shader may generate shading results for a pixel based on specular lighting and diffuse lighting for a point on a scene object, whereby each source of lighting is computed from a corresponding lighting shader. A given shader may be a standard shader and provided as part of the rendering application, or the shader may be a custom shader, created by a shader developer. Each shader, whether standard or custom, may generate a contribution type that may be well known or custom.

Because the goal of high-quality rendering applications is to render images to the highest technically feasible standards, custom shaders are commonly employed to beneficially render certain visual effects and enhance overall image quality. These custom shaders may be separately invoked in a process known in the art as a render pass to generate images corresponding to standard contribution types or custom contribution types.

In order to simultaneously accommodate multiple standard and custom shaders and potential interdependencies between each, high-quality rendering applications conventionally perform a set of separate render passes to drive one shader to compute a complete rendering pass. However, each render pass typically requires significant computation independent of specific shader computations. Therefore, superfluous computations are required in order to perform each additional render pass, leading to inefficiency in the high-quality rendering application. Because the computational load related to a high-quality rendering application typically accounts for a majority of an overall computational effort for a given rendered end product, this inefficiency can be very costly to users.

Furthermore, each custom shader is typically required to implement significant rendering infrastructure related to generic rendering in a specific application context, but not related to the custom shading technique provided by the shader. This rendering infrastructure needs to be replicated for each custom shader, leading to workflow inefficiencies for software developers creating custom shaders.

As the foregoing illustrates, what is needed in the art is a technique for improving efficiency in developing and executing high-quality rendering applications.

SUMMARY OF THE INVENTION

One embodiment of the present invention sets forth a graphics library embedded in a computer-readable medium including instructions that, when executed by a processor, cause the processor to render a graphics image based on one or more shading modules included in the graphics library. The graphics library includes a source code list of shading modules, where each of the listed shading modules corresponds to a different material property for shading, for each listed shading module, a source code shading module that includes source code instructions that define a default shading function associated with the source code shading module and is configured to allow modification of the source code instructions to produce a customized shading function associated with the source code shading module, and a shader template that is configured to incorporate each source code shading module, including, for a particular source code shading module, either the source code instructions for the default shading function associated with the source code shading module or the modified source code instructions for the customized shading function associated with the source code shading module. The shader template is further configured to allow each source code shading module to be compiled into a shading program for rendering the graphics image.

One advantage of the disclosed graphics library is that it provides end-users with a framework for developing customized shading programs to generate customized shading effects. By providing a modular shading template to the end-user and exposing the source code of the different default shading modules to the end-user, the end-user can quite easily modify the default settings to generate customized results.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
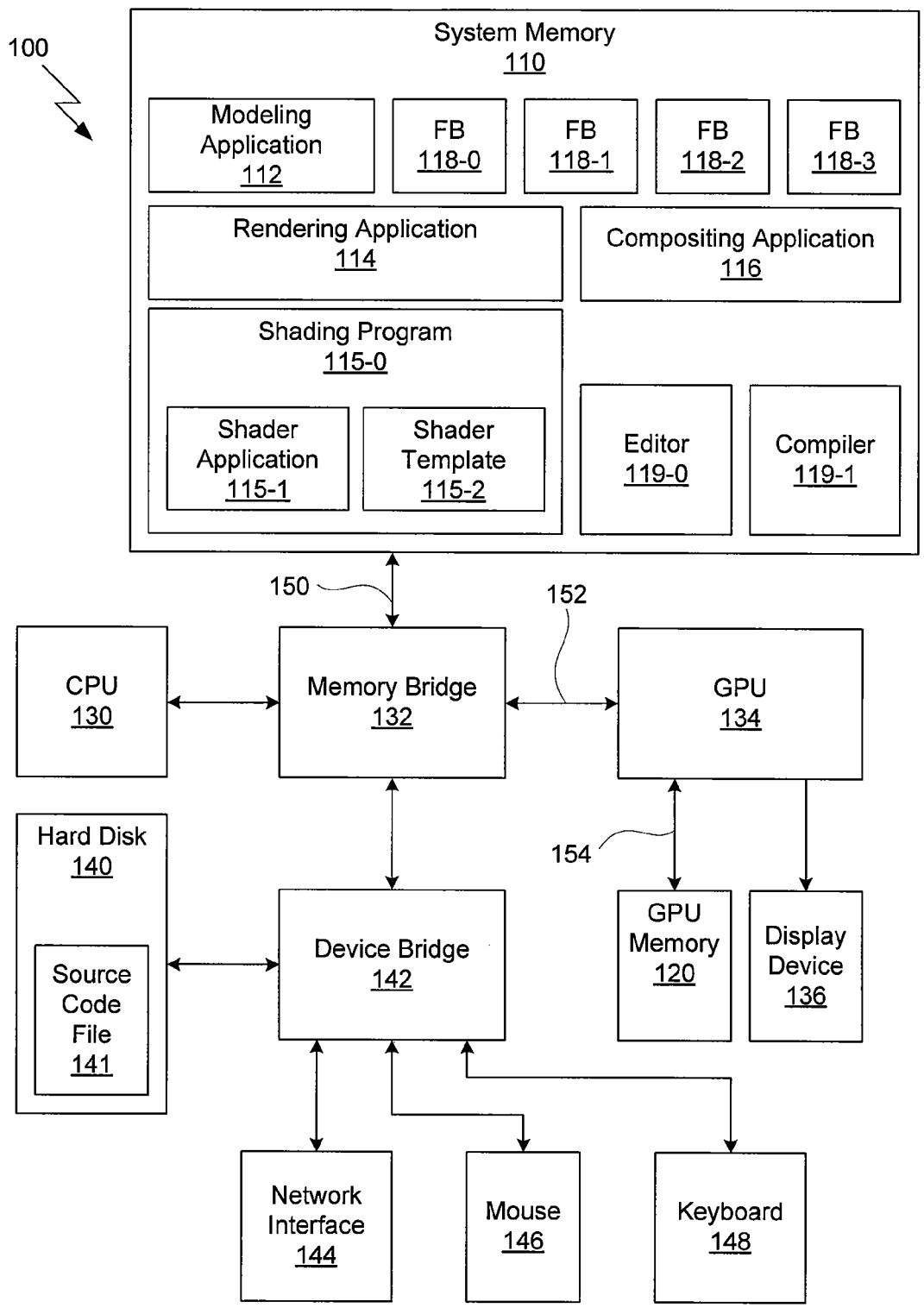
FIG. 1 illustrates a computer system configured to implement one or more aspects of the present invention.

FIG. 1 illustrates a computer system 100 configured to implement one or more aspects of the present invention. The computer system 100 includes, without limitation, a central processing unit (CPU) 130, a system memory 110, a graphics processing unit (GPU) 134, a GPU memory 120, a memory bridge 132, a display device 136, a hard disk 140, a device bridge 142, a network interface 144, a mouse 146, and a keyboard 148.

The CPU 130 communicates with the system memory 110 via the memory bridge 132, which may be, e.g., a Northbridge device or subsystem. System memory 110 is configured to store application programs, as well as data used by or generated by the CPU 130. System memory 110 is coupled to the memory bridge 132 via a system memory bus 150. The memory bridge 132 is coupled to the GPU 134 via a GPU system bus 152. The GPU system bus 152 may comprise any technically feasible data interconnect, such as the well known personal computer interconnect (PCI) express bus. The memory bridge 132 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display device 136, which may comprise a conventional CRT or LCD display. The GPU 134 is coupled to the GPU memory 120 using a GPU memory bus 154. The GPU memory 120 may be configured to store data used by or generated by the GPU 134. Data stored within the GPU memory 120 passes through the GPU 134 and the memory bridge 132 when accessed by the CPU 130. In some embodiments, the integrated circuit implementing the CPU 130 may incorporate additional functional blocks, such as the memory bridge 132 and the device bridge 142. In alternative embodiments, the integrated circuit implementing the GPU 134 may incorporate additional functional blocks, such as the memory bridge 132 and the device bridge 142.

The device bridge 142 is coupled to a hard drive 140, a network interface 144, a mouse 146, and a keyboard 148. The hard drive 140 provides mass storage of programs and data. The network interface 144 provides network connectivity to other computers using a local area network (LAN) interface using any suitable technology, such as Ethernet. The mouse 146 and keyboard 148 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In one embodiment, system memory 110 is configured to store a graphics modeling application 112, a graphics rendering application 114, a compositing application 116, an editor 119-0, and a compiler 119-1. The graphics rendering application 114 should include at least one shader module. The shader module may communicate with the rendering engine using any technically feasible means, such as a rendering application programming interface (API). System memory 110 is also configured to store a plurality of frame buffers 118, which may be configured to store scene segments rendered by the rendering engine, and an image generated by the compositing application 116. The compositing application 116 combines segments according to a contribution value for each segment to generate a composite image. For example, the rendering application 114 may render segments stored in frame buffers 118-0 through 118-2, and the compositing application 116 may combine the segments to generate a composite image, such as a final image, stored in frame buffer 118-3. The rendering application 114 uses shader functions within a customized shader program 115-0 to compute color samples, such as color, transparency, and other aspects of pixels or fragments in a graphics scene.

The editor 119-0 is used to generate and modify source code files stored in persistent memory, such as on the hard disk 140. The compiler 119-1 is configured to read in and parse certain source code files to generate, or "compile" executable code. For example, the editor 119-0 may be used to modify source code file 141 and the compiler 119-1 may compile source code file 141 to generate the customized shading program 115-0. The customized shading program 115-0 should be compiled to include housekeeping functionality for shading operations embodied in a shader application 115-1, and specific shading functions included in a shader template 115-2. The source code file 141 may include a source code representation of the shader template 115-2 and related shader modules. The rendering application 114 may be coupled to the customized shading program 115-0 to incorporate modifications made by the editor 119-0. In one embodiment the customized shading program 115-0 is incorporated into the rendering application 114.

In an alternative embodiment, a first computer system includes a modeling application, and may include a compositing application. Additionally, a set of one or more computer systems may include at least one instance of the rendering application. In this scenario, the set of one or more computer systems is configured to communicate via a computer network. In this embodiment, the first computer system includes software configured to cause each computer system in the set of one or more computer systems to independently render and store scene segments.

Figure 2:
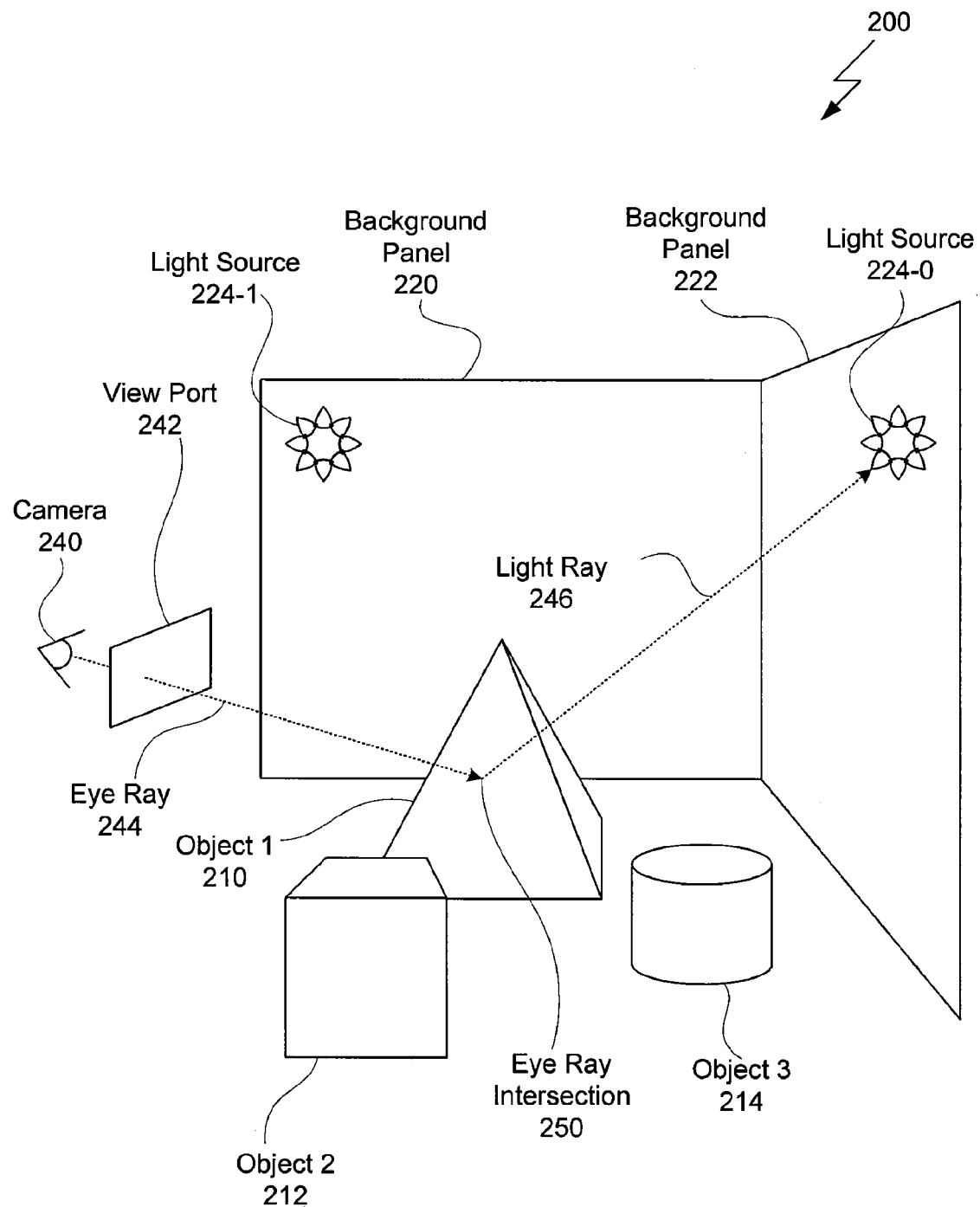
FIG. 2 illustrates a three-dimensional graphics scene.

FIG. 2 illustrates a three-dimensional graphics scene 200. The graphics scene 200 includes geometric objects such as background panels 220 and 222, object 1 210, object 2 212, and object 3 214. Graphics scene 200 also includes a light sources 224.

Object 1 210 may be rendered in isolation for the purpose of rendering scene segments into independent frame buffers 118 that may be used for fine-tuning the rendered image in a subsequent compositing phase. To maximize realism, object 1 210 should be rendered with other objects and lights, in context in the scene, wherein each rendering pass or group of rendering passes may be written to a separate frame buffer.

A camera 240 and an associated position for the camera 240 establish a viewport 242 into graphics scene 200. The viewport 242 comprises a two-dimensional array of pixels, each serving as a sample point of the graphics scene 200. Each pixel may comprise one or more sub-pixel samples. Persons skilled in the art will recognize that rendering the graphics scene 200 may be accomplished using different well known techniques, such as ray tracing or scan line rendering. For example, to compute the color of a pixel in the viewport 242 using ray tracing, at least one eye ray 244 is projected from the camera 240, through the pixel sample in the viewport 242, and into the graphics scene 200 until the eye ray 244 intersects with an object within the graphics scene 200. In this scenario, the eye ray 244 intersects object 1 210 at eye ray intersection 250 on the surface of object 1 210. Depending on material properties of the object 1 210, the eye ray 244 may be projected further into graphics scene 200, for example, along a light ray 246. In this scenario, the light ray 246 intersects light source 224-0, potentially imparting various forms of illumination from light source 224-0 on object 1 210 at the eye ray intersection 250. Each pixel of the viewport 242 is similarly sampled by projecting a corresponding eye ray from the camera 240 through the viewport 242.

Figure 3:
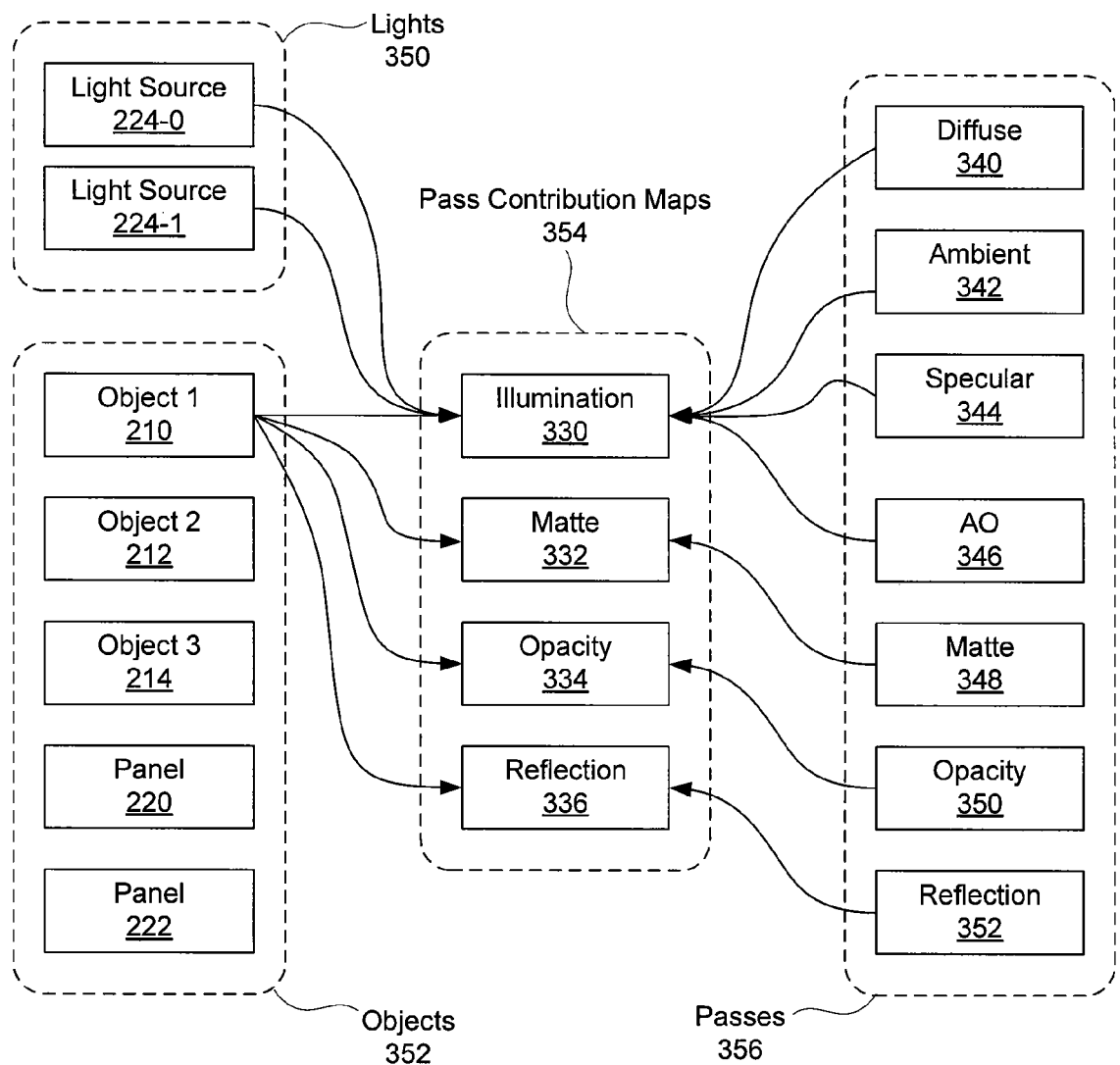
FIG. 3 illustrates associations between a scene and rendering passes, according to one embodiment of the invention.

FIG. 3 illustrates associations between a scene object 210 and rendering passes, according to one embodiment of the invention. Scene objects are organized into a list of objects 352. Lights are organized into a list of lights 350. Rendering passes are organized into a list of passes 356. Pass contributions from each rendering pass for a given object are organized into pass contribution maps 354, which define relationships among objects, lights, rendering passes, and lighting characteristics. In this example, a lighting characteristic is a related set of rendering passes or types of rendering passes.

As shown, rendering passes associated with object 1 210 include, without limitation, diffuse lighting 340, ambient lighting 342, specular lighting 344, ambient occlusion 346, matte surface mapping 348, opacity 350, and reflection 352. Each rendering pass imparts a specific effect on object 1 210. The effects of multiple rendering passes may be grouped into pass contribution maps 354. For example, diffuse lighting 340, ambient lighting 342, specular lighting 344, and ambient occlusion 346 produce an illumination contribution 330; matte surface mapping 348 may produce a matte pass contribution 332; rendering opacity 350 produces an opacity contribution 334; and, a reflection rendering pass 352 produces a reflection contribution 336.

For each object in the graphics scene 200, the pass contribution maps 354 define associations between lights 350, objects 352, and rendering passes 356. These associations may be defined using any technically feasible means. In one embodiment, an application user may define associations between objects, lights, and rendering passes using a graphical user interface (GUI) associated with the rendering application 114 of FIG. 1. One exemplary layout of a GUI used to define associations between objects and rendering passes is illustrated in FIG. 3. Persons skilled in the art will recognize that a drag-and-drop scheme for defining associations may provide an intuitive and efficient entry means for users. Association data should be stored in modeling application 112 and transferred to rendering application 114 and compositing application 116 using any technically feasible means. By defining, rendering, and storing results of each rendering pass in a separate frame buffer, the user is able to subsequently fine-tune the contribution of each rendering pass (e.g., in a compositing application) without performing additional time consuming rendering operations.

In one embodiment, object, light, rendering pass, and frame buffer association information needed to generate the pass contribution maps 354 are transmitted to the rendering application 114 to render each separate segment associated with each object (or set of objects) into a separate frame buffer.

Figure 4:
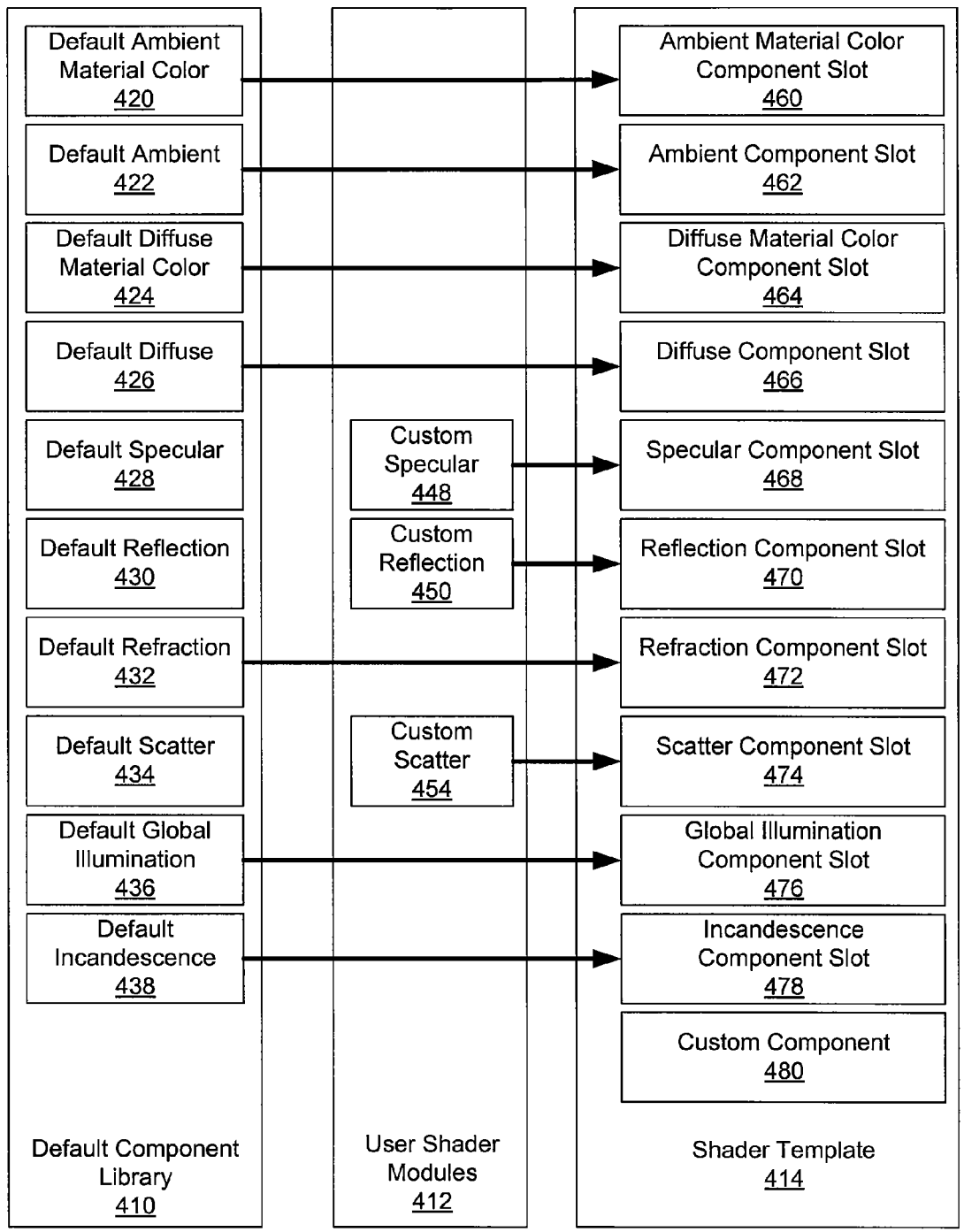
FIG. 4 illustrates a modular shader architecture for computerized image rendering, according to one embodiment of the invention.

FIG. 4 illustrates a modular shader architecture for computerized image rendering, according to one embodiment of the invention. The modular shader architecture includes a default component library 410, comprising a set of default shader modules, user shader modules 412, and a shader template 414, such as shader template 115-2.

The default component library 410 may include default shader modules for most types of conventional shading effects. For example, the default component library 410 may include default shader modules for default ambient material color 420, default ambient light 422, default diffuse material color 424, default diffuse light 426, default specular lighting 428, default reflection 430, default refraction 432, default scatter 434, default global illumination 436, and default incandescence 438.

The default shader modules within the default component library 410 should be used by the rendering application 114 if no user shader module is specified. When no user shader module is specified the default shaders are gathered within the shader template 414, which is then compiled with other related modules, such as shader application 115-1, into the customized shader application 115-0. The customized shader application 115-0 includes an interface, such as a first API, for calling functions within the compiled shader template 414, and a second interface, such as a second API, for receiving calls from the rendering application 114. If a user shader module is specified to replace a corresponding default shader module, then the user shader module replaces a respective default shader module within the shader template 414. When the shader template 414 is compiled into the customized shader application 115-0, the rendering application 114 invokes the user shader module instead of the default shader module when invoking a corresponding shading operation. For example, a brushed metal shader may replace the default specular shader module 428, the default reflection shader module 430, and the default scatter shader module 434 with a custom specular shader module 448, a custom reflection shader module 450, and a custom scatter shader module 454, respectively. The custom shader modules 448, 450, 454, specified as user shader modules 412, are available to the rendering application 114 to render one or more scene objects requiring specialized shading for these specific types. In this scenario, the custom shader modules replace their corresponding default shader modules in the shader template 414 for use by the rendering application 114.

The rendering application 114 accesses the customized shader application 115-0, which is generated using shader modules from either the default component library 410 or from the set of user shader modules 412. The shader template 414 is configured to include slots for well known rendering components, as well as slots for custom rendering components. In one embodiment, the well known component slots include an ambient material color component slot 460, an ambient component slot 462, a diffuse material color component slot 464, a diffuse component slot 466, a specular component slot 468, a reflection component slot 470, a refraction component slot 472, a scatter component slot 474, a global illumination component slot 476, an incandescence component slot 478, and one or more custom component slots 480. Persons skilled in the art will recognize these shader module types and readily understand how to implement the associated shading functions.

In one embodiment, a C++ template mechanism is used to instantiate and incorporate the custom shader modules 448, 450, 454 into the shader template 414 to form a useable shader. Persons skilled in the art will recognize that a C++ function template is an abstract function definition configured to operate on generic data types, and that a function template may include one or more type-specific implementations, each configured to operate on a specific data type or class. The C++ template mechanism resolves data type to implementation type bindings at compile time, enabling a compiler to advantageously generate high-performance, in-line executable code. Furthermore, certain portions of a shader application may be distributed to a user as object code to keep proprietary implementation information secure, while user-configurable portions may be distributed as source code, which includes default shading modules that may be modified by a user. Each default shading module may be customized by defining a corresponding custom implementation for the shading module. A list of defined slots for the default shading modules is provided in source code. When a user customizes a shading module within the source code and compiles the source code, in conjunction with other application object files, the customized shader application 115-0 is generated. At this point, the customized shader application 115-0 includes user customizations to the shading modules.

Table 1 includes exemplary C++ code fragments for computing specular effects within a Phong shader component for incorporation into an implementation of the modular shader architecture based on C++ function templates. Persons skilled in the art will recognize that each of the each important aspect of computing specular effects for Phong shading with respect to an individual sample may be easily modified in the code fragments. Specifically, the user may modify Equations 1 through 4 in the code fragments given in Table 1 to modify Phong shading specular behavior of a shader application compiled to include the code fragments. Importantly, for any given shader proprietary details of the shader application may be hidden from the user, whereas shading computation details for a given image sample may be fully revealed to the user in the form of source code. The source code also serves to provide structure for any customization needed by the user.

$$\text{materialSpecularColor}=\text{*mi\_eval\_color}(\&\text{paras}\rightarrow\text{specularColor}) \quad (\text{Eq. 1})$$

$$\text{specularExponent}=\text{*mi\_eval\_scalar}(\&\text{paras}\rightarrow\text{cosPower}) \quad (\text{Eq. 2})$$

$$\text{reflectionSpecularity}=\text{*mi\_eval\_scalar}(\&\text{paras}\rightarrow\text{reflectionSpec}) \quad (\text{Eq. 3})$$

$$\text{resSpecular}=\text{phongSpecular}*\text{materialSpecularColor} \quad (\text{Eq. 4})$$

TABLE 1

```
template <typename ParameterType, typename ShaderHelper>
    class AppPhongSpecularComponent
{
public:
    AppPhongSpecularComponent(miState *state,
                ParameterType *paras);
    ~AppPhongSpecularComponent( ) { };
    // Called from the light loop in to determine specular
    // component for the current sample.
    miColor operator( )(miState *state,
                ParameterType *paras,
                ShaderHelper &helper,
                miVector &pLightDirection,
                miVector &pReflectionDirection,
                miScalar pDotNL,
                miVector &pBumpNormal);
public:
    miColor materialSpecularColor;
    miScalar specularExponent;
    miScalar reflectionSpecularity;
};
template<typename ParameterType, typename ShaderHelper>
```

TABLE 1-continued

```
AppPhongSpecularComponent<ParameterType, ShaderHelper>::
    AppPhongSpecularComponent(miState *state, ParameterType *paras)
{
    // pre-compute stuff that doesn't change inside light loop
    materialSpecularColor = *mi_eval_color(¶s->specularColor);
    specularExponent = *mi_eval_scalar(¶s->cosPower);
    reflectionSpecularity = *mi_eval_scalar(¶s->reflectionSpec);
}
template<typename ParameterType, typename ShaderHelper>
    miColor AppPhongSpecularComponent<ParameterType,
    ShaderHelper>::operator( )(miState *state,
                ParameterType *paras,
                ShaderHelper &helper,
                miVector &pLightDirection,
                miVector &pReflectionDirection,
                miScalar pDotNL,
                miVector &pBumpNormal)
{
    miColor resSpecular = APP_BLACK;
    if (pDotNL >0.0f) {
        miScalar phongSpecular = compute_phong_specular(
                &pLightDirection,
                specularExponent,
                reflectionSpecularity,
                &pReflectionDirection,
                state);
        if (phongSpecular > 0.0f) {
            resSpecular = phongSpecular * materialSpecularColor;
        }
    }
    return resSpecular;
}
// Use the SpecularShaderHelper to correctly compute reflections and
// attenuation for specular materials
typedef SpecularShaderHelper<AppPhongParameters>
    SpecularShaderHelperType;
```

Only specular effects were changed in the Phong shader code fragments in Table 1, however additional effects or parts are typically associated with Phong shading. In Table 2, below, default implementations for other, non-specular parts are incorporated in a customized Phong shader using default behaviors. In the last line of Table 2, an "Application Phong Class," or "AppPhongClass" is instantiated, causing a compiler to generate executable code according to the code fragments in Table 1 and link the executable code with other application objects to generate a shader application that incorporates any custom user functionality added to the code fragments of Table 1.

TABLE 2

```
// Definition AppPhongClass as a specialization of the Surface template.
// Except for the above specular component we use the default
// implementations of all other components.
typedef Surface
<
    AppPhongParameters,
    SurfaceShaderReturnType,
    SpecularShaderHelperType,
    DefaultAmbientMaterialColorComponent
        <AppPhongParameters, SpecularShaderHelperType>,
    DefaultAmbientComponent<AppPhongParameters,
        SpecularShaderHelperType>,
    DefaultDiffuseMaterialColorComponent
        <AppPhongParameters, SpecularShaderHelperType>,
    DefaultDiffuseComponent<AppPhongParameters,
                SpecularShaderHelperType>,
    AppPhongSpecularComponent<AppPhongParameters,
                SpecularShaderHelperType>,
    DefaultSpecularReflectionComponent<AppPhongParameters,
                SpecularShaderHelperType>
> AppPhongClass;
```

Other technically feasible techniques may also be used to implement the modular shader architecture without departing from the scope of the invention; for example, the invention could also be implemented using a polymorphic object oriented approach.

Figure 5:
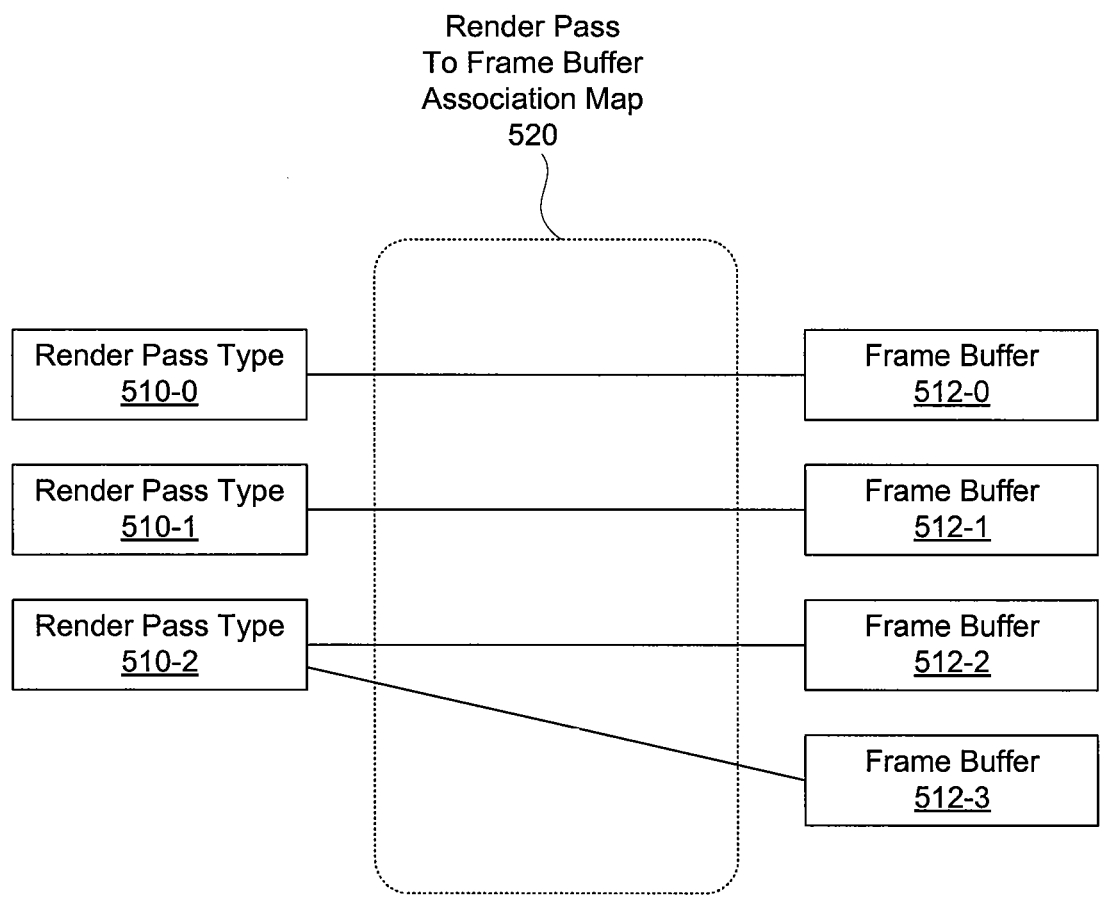
FIG. 5 illustrates associating render pass types with specific frame buffers, according to one embodiment of the invention.

FIG. 5 illustrates associating render pass types 510 with specific frame buffers 512, according to one embodiment of the invention. Each component slot within the shader template 414 of FIG. 4 may optionally be associated with a render pass type. A frame buffer may be used to store results from shading a specific render pass type. Mapping render pass types to frame buffers is accomplished using a render pass to frame buffer association map 520.

For example, render pass type 510-0 is associated with frame buffer 512-0, render pass type 510-1 is associated with frame buffer 512-1, and render pass type 510-2 may be associated with frame buffers 512-2 and 512-3. In one embodiment, a user specifies the render pass to frame buffer association map 520 as part of a modeling and data entry process that may be facilitated using an associated GUI.

Figure 6:
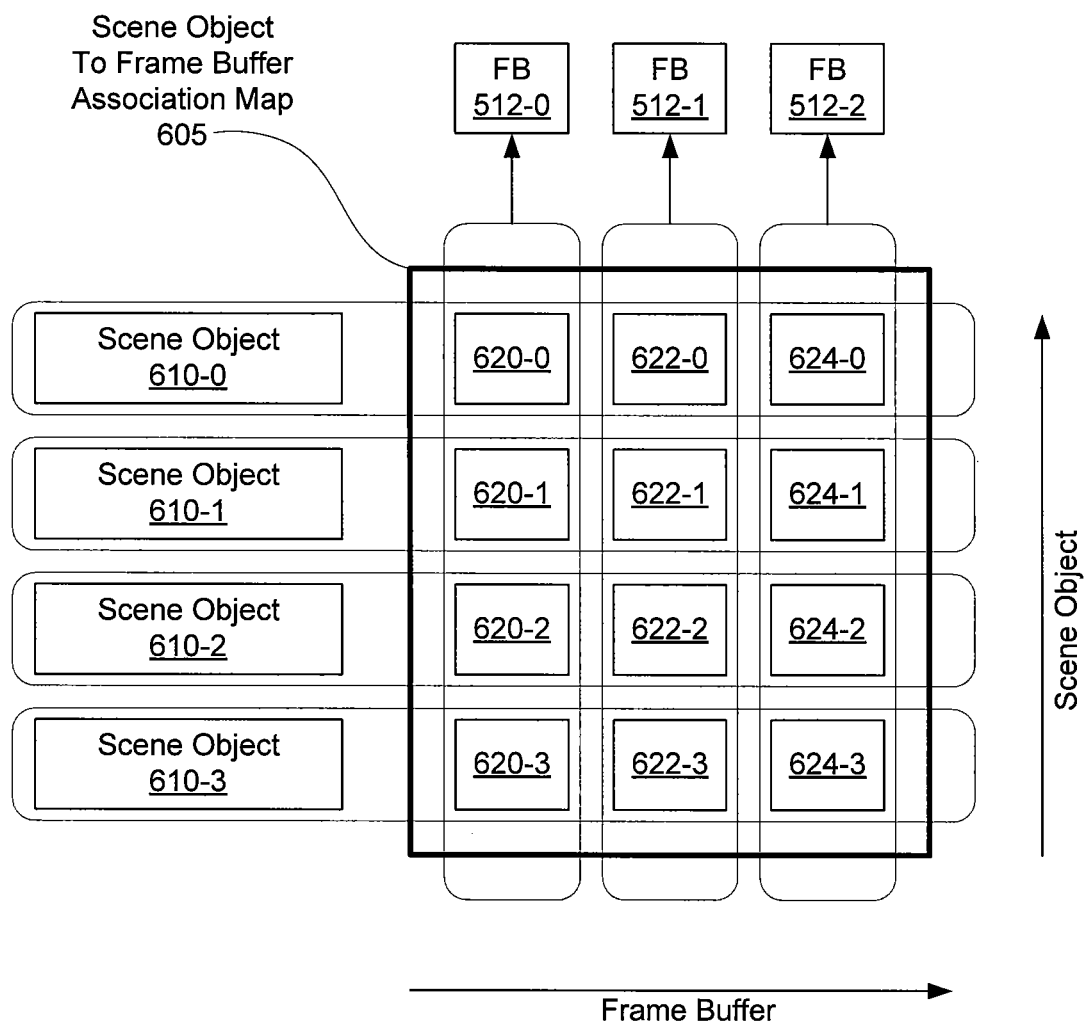
FIG. 6 illustrates a scene object to frame buffer association map, according to one embodiment of the invention.

FIG. 6 illustrates a scene object to frame buffer association map 605, according to one embodiment of the invention. The scene object to frame buffer association map 605 associates individual scene objects 610 with individual frame buffers 512. The frame buffers 512 were previously configured to be associated with specific render pass types 510, as discussed in FIG. 5.

The frame buffer association map 605 includes one bit entries 620, 622, and 624 used to indicate whether a given scene object should be associated with a respective frame buffer 512, and therefore the render pass types associated with the frame buffer. For example, entry 622-1 specifies whether scene object 610-1 should contribute to frame buffer 512-1, which is generated from render pass type 510-1. Furthermore, a horizontal set of bit entries 620-$n$, 622-$n$, and 624-$n$, for a given value of n, specifies contributions of scene object 610-$n$ to the respective frame buffers. In one embodiment, this horizontal set of bit entries is encoded as a hexadecimal string, providing a compact means of completely specifying scene object 610 to frame buffer 512 associations.

Figure 7:
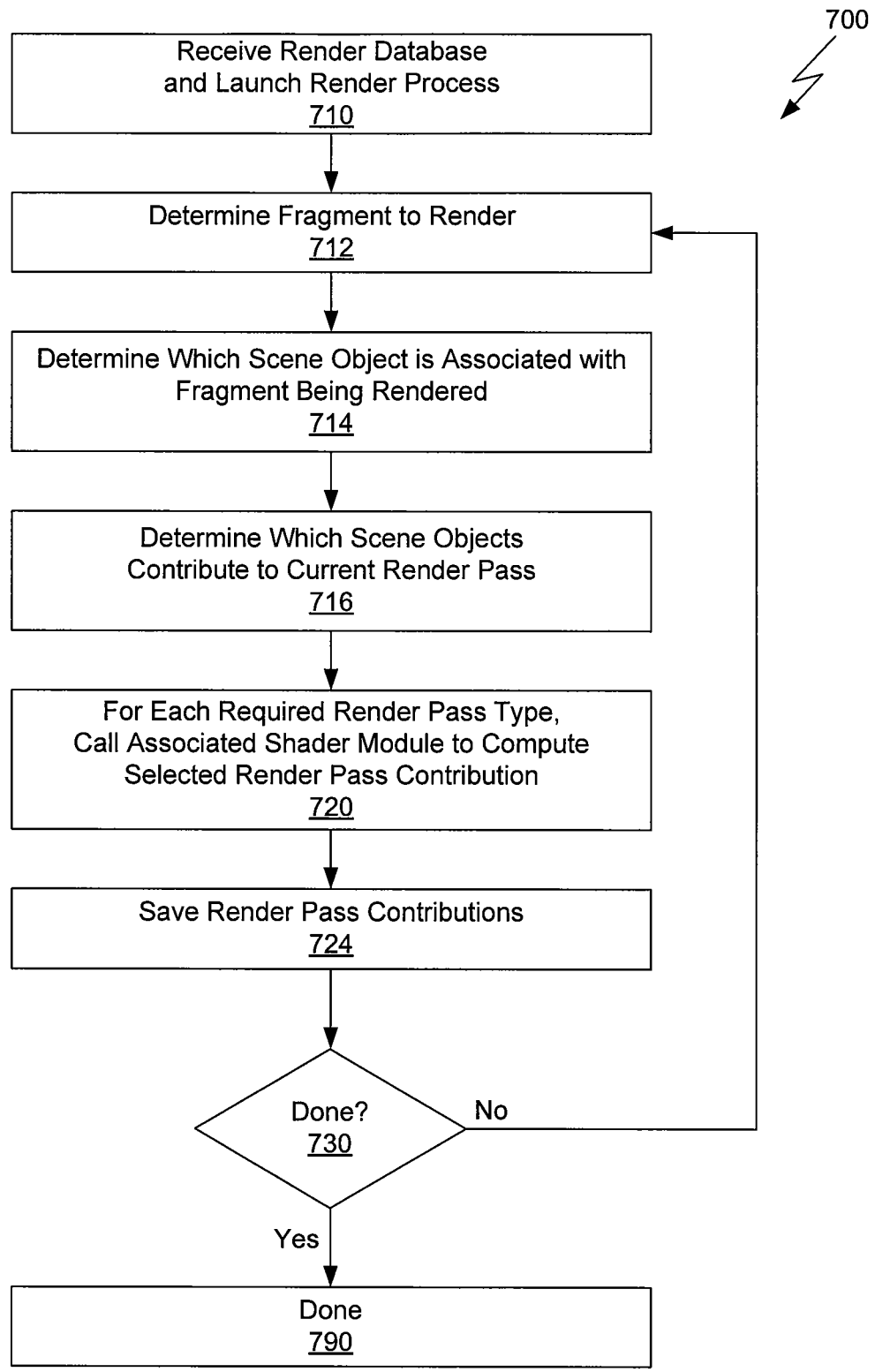
FIG. 7 is a flow diagram of method steps for rendering with multiple shaders in a single rendering phase, according to one embodiment of the invention.

FIG. 7 is a flow diagram of method steps 700 for rendering with multiple shaders in a single rendering phase, according to one embodiment of the invention. Although the method steps are described in conjunction with the systems of FIGS. 1, 3, 4, 5, and 6, persons skilled in the art will understand that any system configured to perform the method steps, in any order, is within the scope of the invention.

The method begins in step 710, where the rendering application 114 receives a render database and launches a rendering process. The render database includes detailed specifications of scene objects, light sources, and cameras within a graphic scene.

In step 712, the rendering application determines a fragment to render, based on a camera position, as specification within the render database. In step 714, the rendering application determines which scene object is associated with the fragment being rendered. In one embodiment, the rendering application projects an eye ray from the camera, through a viewport, into the graphics scene to find an intersected object within the graphics scene.

In step 716, the rendering application determines which scene objects contribute to the current render pass by examining an associated scene object to frame buffer association map and a render pass to frame buffer association map. In one embodiment, both the scene object to frame buffer association map and the render pass to frame buffer association map are stored within one or more pass contribution maps.

In step 720, for each required render pass type, the rendering application calls an associated shader module to compute a respective render pass contribution. In step 724, the computed render pass contribution is saved into an associated frame buffer, as indicated by the scene object to frame buffer association map. If, in step 730, each pixel within the viewport is not yet rendered and the rendering process is not done, the method proceeds to step 712.

Returning to step 730, if each pixel within the viewport is rendered and the rendering process is done, then the method terminates in step 790.

The method steps 700 may be repeated for each unique camera specified within the render database.

Figure 8:
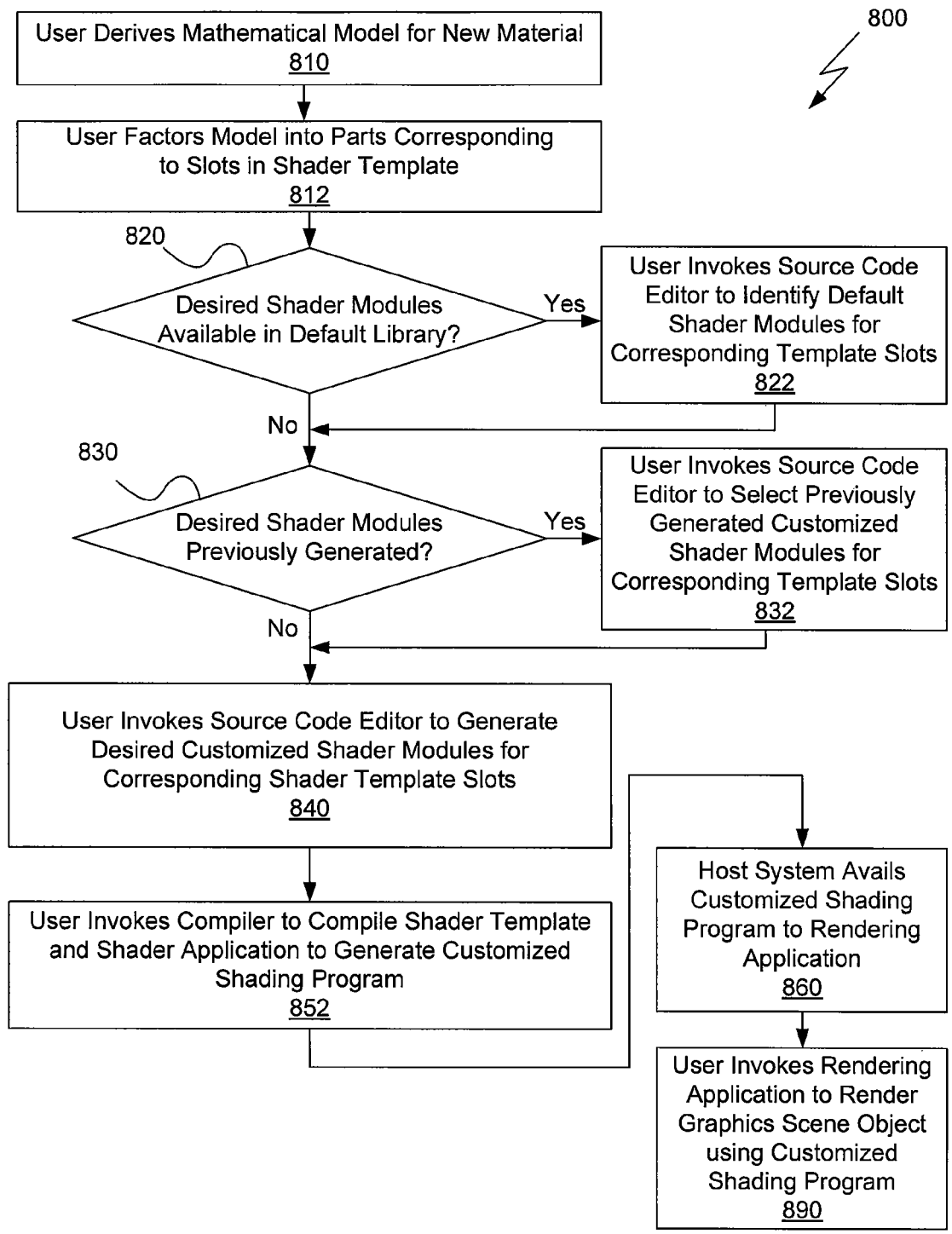
FIG. 8 is a flow diagram of method steps for rendering a graphics scene object using a customized shading program, according to one embodiment of the invention.

FIG. 8 is a flow diagram of method steps 800 for rendering a graphics scene object using a customized shading program, according to one embodiment of the invention. Although the method steps are described in conjunction with the systems of FIGS. 1, 3, 4, 5, and 6, persons skilled in the art will understand that any system configured to perform the method steps, in any order, is within the scope of the invention.

The method begins in step 810, where a user (a developer) derives a mathematical model for a new material for use in a graphics rendering application. A new material may be characterized as having certain properties with respect to absorbing, emitting, reflecting, diverting, or otherwise modifying or generating light in a graphics scene. The mathematical model for the new material may include aspect of existing or default material models, as well as aspects that are new. In step 812, the developer factors the mathematical model into a plurality of parts, functionally corresponding to slots in a shader template, such as shader template 414 of FIG. 4. Each slot of the shader template requires an associated shader module.

If, in step 820, desired shader modules are available in a default library, such as the default component library 410, then the method proceeds to step 822, where the user invokes a source code editor to identify default shader modules from the default library for inclusion in corresponding template slots within the shader template. The user may identify one or more default shader modules as desired shader modules based on whether a given default shader module satisfies a corresponding desired behavior of the mathematical model. The method then proceeds to step 830.

Returning to step 820, if no desired shader modules are available, then the method proceeds to step 830. If, in step 830, one or more desired shader modules from a set of previously generated shader modules is available, then the method proceeds to step 832, where the user invokes the source code editor to select previously generated customized shader modules for corresponding template slots within the shader template. The user may identify one or more previously generated customized shader modules as desired shader modules based on whether a given previously generated customized shader module satisfies a corresponding desired behavior of the mathematical model and whether a corresponding slot was previously satisfied by a default shader module. The method then proceeds to step 840.

Returning to step 830, if no desired shader module from the set of previously generated shader modules is available, then the method proceeds to step 840. In step 840, the user invokes the source code editor to generate desired customized shader modules for corresponding shader template slots. The user may generate a desired customized shader module for each slot remaining unsatisfied by either a default shader module or a previously generated customized shader module. The user may generate a customized shader module using source code from a corresponding default shader module as an example or starting point. As illustrated in FIG. 4, each custom shader module may replace a corresponding default shader module.

In step 852, the user invokes a compiler to compile the shader template into a shader object, which is linked to a shader application object to generate a customized shading program, such as customized shading program 115-0. The compiler may optionally save each object. In one embodiment, the compiler is a C++ compiler.

In step 860, a host system avails the customized shading program, such as customized shading program 115-0, to a rendering application, such as rendering application 114 of FIG. 1. The method terminates in step 890, where the user invokes the rendering application to render a graphics scene object using the customized shading program. The user may follow method steps 800 more than once to render each of one or more graphics objects within a graphics scene.

In sum, a technique is disclosed for the rapid development of custom shaders within a customized shading program using a modular shader architecture. The modular shader architecture includes a default component library comprising default shader modules and a facility to incorporate custom user shader modules into a shader template that is used for rendering a graphics image. During a rendering phase, the rendering application computes each sample needed to generate a graphics image. The rendering application invokes shading operations from the customized shading program. The customized shading program is generated from a shader template. The rendering application may save shader results to one or more corresponding frame buffers.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for rendering a graphics image, the method comprising:
    receiving a render database that includes a plurality of scene objects, one or more light sources, and one or more cameras;
    selecting an image pixel to render based on a position of one of the one or more cameras in the render database;
    identifying a scene object in the plurality of scene objects corresponding to the image pixel;
    determining a set of render pass types required to render the image pixel;
    for each render pass type in the set of render pass types, invoking at least one shader module to render the image pixel; and
    for each render pass type in the set of render pass types, storing the rendered image pixel in at least one dedicated frame buffer.

2. The method of claim 1, wherein the steps of determining the set of render pass types comprises examining a plurality of bit entries within a first data structure that indicate which frame buffers should receive the rendered image pixels; and examining a second data structure to determine which render pass types are associated with the frame buffers that receive the rendered image pixels.

3. The method of claim 2, wherein the first data structure is represented within a computer file as a sequence of hexadecimal strings corresponding directly to each scene object included in the render database.

4. The method of claim 2, wherein the first data structure comprises a two-dimensional array of bits organized to index different frame buffers along a first dimension and different scene objects along a second dimension.

5. The method of claim 4, wherein a row of bits along the first dimension is represented with a hexadecimal string to facilitate access between graphics applications.

6. The method of claim 1, wherein the invoked shader modules are included in a set of template shader modules.

7. The method of claim 6, wherein the set of template shader modules is derived from a standard component library of shader modules and a set of user derived shader modules.

8. The method of claim 7, wherein the set of template shader modules is structured with each shader module in the set of user derived shader modules having replaced a corresponding standard component library shader module of equivalent type.

9. The method of claim 7, wherein each shader module in the set of template shader modules is compiled to generate in-line executable code.

10. The method of claim 1, wherein the steps of determining an image pixel, determining a set of render pass types, invoking at least one shader module, and storing the rendered image pixel are repeated for a plurality of additional image pixels.

11. A non-transitory computer-readable medium including instructions that, when executed by a processing unit, cause the processing unit to render a graphics image, by performing the steps of:
    receiving a render database that includes a plurality of scene objects, one or more light sources, and one or more cameras;
    selecting an image pixel to render based on a position of one of the one or more cameras in the render database;
    identifying a scene object in the plurality of scene objects corresponding to the image pixel;
    determining a set of render pass types required to render the image pixel;
    for each render pass type in the set of render pass types, invoking at least one shader module to render the image pixel; and
    for each render pass type in the set of render pass types, storing the rendered image pixel in at least one dedicated frame buffer.

12. The non-transitory computer-readable medium of claim 11, wherein the steps of determining the set of render pass types comprises examining a plurality of bit entries within a first data structure that indicate which frame buffers should receive the rendered image pixels; and examining a second data structure to determine which render pass types are associated with the frame buffers that receive the rendered image pixels.

13. The non-transitory computer-readable medium of claim 12, wherein the first data structure is represented within a computer file as a sequence of hexadecimal strings corresponding directly to each scene object included in the render database.

14. The non-transitory computer-readable medium of claim 12, wherein the first data structure comprises a two-dimensional array of bits organized to index different frame buffers along a first dimension and different scene objects along a second dimension.

15. The non-transitory computer-readable medium of claim 14, wherein a row of bits along the first dimension is represented with a hexadecimal string to facilitate access between graphics applications.

16. The non-transitory computer-readable medium of claim 11, wherein the invoked shader modules are included in a set of template shader modules.

17. The non-transitory computer-readable medium of claim 16, wherein the set of template shader modules is derived from a standard component library of shader modules and a set of user derived shader modules.

18. The non-transitory computer-readable medium of claim 17, wherein the set of template shader modules is structured with each shader module in the set of user derived shader modules having replaced a corresponding standard component library shader module of equivalent type.

19. The non-transitory computer-readable medium of claim 17, wherein each shader module in the set of template shader modules is compiled to generate in-line executable code.

20. The non-transitory computer-readable medium of claim 11, wherein the steps of determining an image pixel, determining a set of render pass types, invoking at least one shader module, and storing the rendered image pixel are repeated for a plurality of additional image pixels.

* * * * *